United States Patent [19]
Eddington

[11] Patent Number: 5,966,165
[45] Date of Patent: Oct. 12, 1999

[54] VIDEOPHONE INTERFACE ARRANGEMENT AND METHOD THEREFOR

[75] Inventor: Chris Eddington, San Jose, Calif.

[73] Assignee: 8×8, Inc., Santa Clara, Calif.

[21] Appl. No.: 08/934,179

[22] Filed: Sep. 19, 1997

[51] Int. Cl.$^6$ .................................................. H04N 7/14
[52] U.S. Cl. .......................... 348/14; 348/15; 379/93.17
[58] Field of Search ................................. 348/14, 15, 16, 348/17

[56] References Cited

U.S. PATENT DOCUMENTS

| | | |
|---|---|---|
| 5,079,627 | 1/1992 | Filo . |
| 5,379,351 | 1/1995 | Fandrianto et al. . |
| 5,392,284 | 2/1995 | Sugiyama ................................. 348/14 |
| 5,448,286 | 9/1995 | Decaesteke et al. . |
| 5,510,829 | 4/1996 | Sugiyama et al. ........................ 348/14 |
| 5,541,640 | 7/1996 | Larson . |
| 5,597,813 | 1/1997 | Fandrianto et al. . |
| 5,737,321 | 4/1998 | Takahashi ................................ 379/202 |

FOREIGN PATENT DOCUMENTS

| | | | |
|---|---|---|---|
| 401311744 | 12/1989 | Japan ............................. | H04M 1/00 |

OTHER PUBLICATIONS

"Xyclops™ 220 Personal videophone" Product datasheet, http://www.mmtech.co.uk/x220data.html, 3 pages (Mar. 26, 1997).

"Xyclops™ 224 POTS videophone" Preliminary datasheet, http://www.mmtech.co.uk/x224data.html, 3 pages Mar. 26, 1997).

"ViaTV Phone Owner's Guide, Model VC100 Upgrade" pp. 1–28, ©1997, 8×8, Inc.

"8×8's Video Communication [sic] Processor VCP", http://www.8x8.com/docs/chips/vcp.html, 3 pages (Jun. 2, 1997).

"8×8's Low Bitrate Video Processor LVP", http://www.8x8.com/docs/chips/lvp.html, 4 pages (Mar. 26, 1997).

"DT–5: Enabling Technologies Desktop Video Conferencing", http://www.visc.vt.edu/succeed/videoconf.html, 7 pages (Jun. 2, 1997).

"Line Transmission of Non–Telephone Signals Terminal for Low Bitrate Multimedia Communication", ITU–T Telecommunication Standardization Sector of ITU, Draft ITU–T Recommendation H. 324, pp. 1–33 (Nov. 22, 1995).

*Primary Examiner*—Curtis A. Kuntz
*Assistant Examiner*—Melur Ramakrishnah

[57] ABSTRACT

A videophone includes an interface that enables communication between a videophone and another type of device, such as a speech-only telephone. In one embodiment, a signal processing circuit processes video and another type of information, respectively, in parallel data paths and operates in either a non-video mode or a video mode in response to whether or not another communicatively-coupled terminal represents that it is not operable as a compatible videophone. A two-way converter circuit coupled between the signal processing circuit and the communication channel transceives the video and the other type of information as processed in the parallel data paths with the signal processing circuit, and transceives the video and the other type of information with the communication channel.

18 Claims, 2 Drawing Sheets

VIDEOPHONE INTERFACE ARRANGEMENT AND METHOD THEREFOR

FIELD OF THE INVENTION

The present invention relates to communication systems. More particularly, the present invention relates to interfacing communication devices.

BACKGROUND OF THE INVENTION

It has been desirable to transmit and receive not only the voices of parties to a telephone conversation, but also their faces and other images. Early attempts to transmit images involved sending and receiving still images using standard telephone lines. More recently, data compression technology has facilitated the transmission of moving images using standard telephone lines. These compression techniques have also been used to compress audio information, such as speech. Compressing both audio and video information allows the information to be sent within the bandwidth constraints of conventional telephone lines. As a result, it is possible to transmit and receive telephone-quality speech and video images of adequate quality.

Many conventional speech-only telephones, on the other hand, transmit speech as analog signals rather than as compressed digital signals. With videophones and speech-only telephones employing different transmission techniques, it has been difficult for videophones to communicate with speech-only telephones. As a result, use of videophones has been largely limited to communication with compatible videophones. The lack of compatibility between videophones and conventional speech-only telephones has hampered the proliferation of videophones.

SUMMARY OF THE INVENTION

According to one embodiment, the present invention is directed to a communication system having a videophone that transceives video and other signal types. The videophone includes a signal processing circuit configured and arranged to process video and another type of information, respectively, in parallel data paths and to operate in a non-video mode in response to another communicatively-coupled terminal sending information representing that the other terminal is not operable as a compatible videophone, and to operate in a video mode in response to another terminal sending information representing that the other terminal is operable as a compatible videophone. The videophone also includes a two-way converter circuit coupled between the signal processing circuit and the communication channel and configured to transceive the video and the other type of information as processed in the parallel data paths with the signal processing circuit, and to transceive the video and the other type of information with the communication channel.

Another embodiment of the present invention is directed to a method for using a videophone to transceive video and another type of information over a communication channel. The method comprises: providing a signal processor circuit and a set of parallel data paths for carrying video and another type of information, respectively, separately; in response to another communicatively-coupled terminal sending information representing that the other terminal is not operable as a compatible videophone, ignoring data that would otherwise be present as video in the set of parallel data paths and processing only the other type of information; in response to another terminal sending information representing that the other terminal is operable as a compatible videophone, using the signal processor circuit to process both the video and the other type of information in a videophone call; and coupling the set of parallel data paths with the communication channel.

The above summary of the invention is not intended to describe each disclosed embodiment of the present invention. This is the purpose of the figures and of the detailed description that follows.

BRIEF DESCRIPTION OF THE DRAWINGS

Other aspects and advantages of the present invention will become apparent upon reading the following detailed description and upon reference to the drawings in which.

Figure 1:
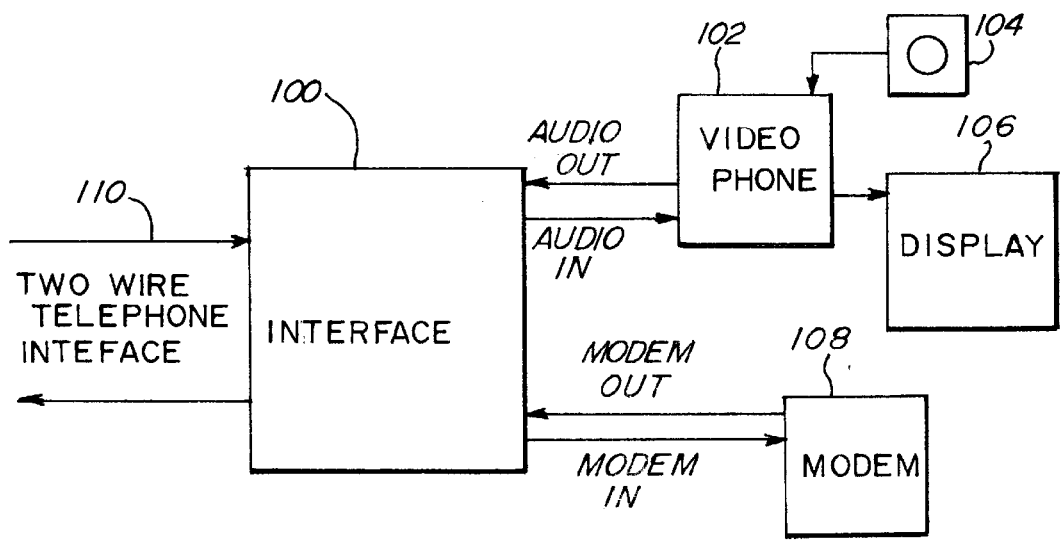
FIG. 1 is a block diagram of an example communication system, according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of systems and arrangements that communicate video and other types of signals, such as audio. The invention has been found to be particularly advantageous in application environments in which videophones communicate with speech-only telephones. An appreciation of various aspects of the invention is best gained through a discussion of various application examples operating in such environments.

FIG. 1 is a block diagram of an example communication system according to an embodiment of the present invention. The system exemplifies an environment in which both video and speech data can be, but not necessarily are, processed. An interface 100 exchanges audio data with a videophone 102. The videophone 102 includes video communication equipment, for example, an analog-to-digital (A/D) converter (not shown) that receives video data from a video camera 104. It should be understood that, while FIG. 1 illustrates the videophone 102 and the video camera 104 as separate components, the video camera 104 can be integrated as part of the videophone 102. The videophone 102 also provides video output to a computer monitor or other display device 106. The display device 106 can be integrated as part of the videophone 102.

The interface 100 also exchanges modem data with a modem 108. For example, the interface 100 can receive an analog signal from the two-wire telephone interface, cancel the transmitting signals and send the received signal to the modem. The modem converts this analog signal into digital data, which it provides, for example, to a personal computer (not shown), and to the videophone processor.

The interface 100 combines the modem and audio signals and generates an output signal. The output signal optionally also carries other types of information, e.g., dual-tone multi-frequency (DTMF) tones and caller identification (CI) information. The interface 100 presents the output signal to the two-wire telephone interface 110, which transmits the output signal to a system at another location.

The two-wire telephone interface 110 carries signals in both directions across the telephone line. With signals flowing bi-directionally, the signal present on the telephone line generally contains both input and output components. The interface 100 is configured and arranged to separate the signal into its components, allowing both audio and modem signals to be transmitted and received from the telephone line. Accordingly, the videophone 102 can act as a speech-only telephone. Moreover, the modem 108 can be used as a DTMF tone generator and can be used to monitor other modem signals, such as CI information, simultaneously with speech-only processing.

Figure 2:
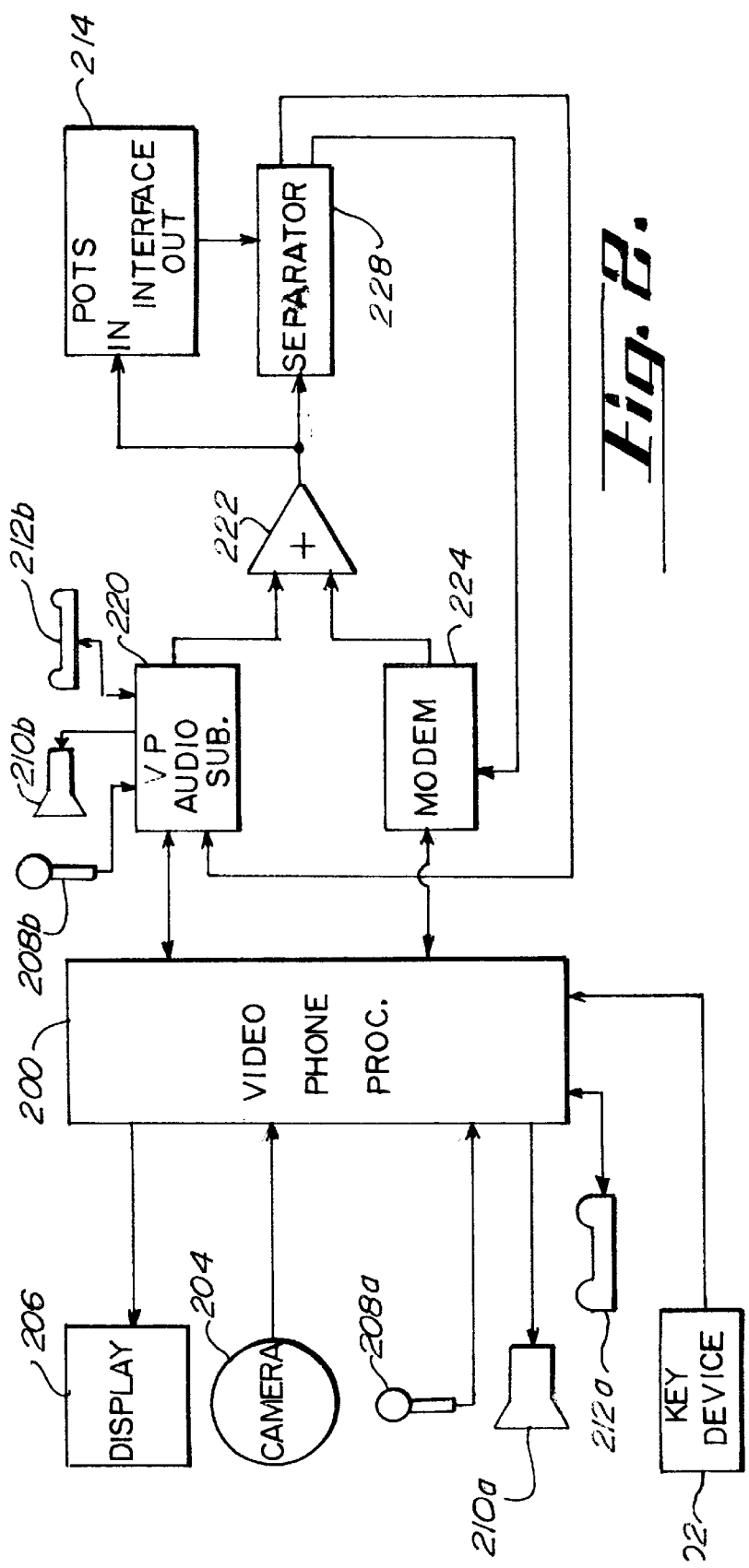
FIG. 2 is a block diagram of an example communication system showing another embodiment of the present invention.

FIG. 2 illustrates an example communication system according to another embodiment of the present invention. A videophone processor 200 receives video data from a video source, such as from a video camera 204. The videophone processor 200 is configured to receive the video data and display this same data, and/or video data generated from another terminal, for viewing at a display 206. The videophone processor 200 can also be configured to receive keyed data, e.g., from a keypad 202, and to transceive audio signals to and from audio equipment, e.g., a microphone 208a, a speaker 210a and/or a telephone handset 212a, using conventional audio conversion techniques.

The videophone processor 200 can be implemented using any of a variety of processor arrangements, including that disclosed in U.S. patent application Ser. Nos. 08/692993 and 08/658917, respectively entitled and relating to issued patents also entitled "Programmable Architecture and Methods for Motion Estimation" (U.S. Pat. No. 5,594,813) and "Video Compression and Decompression Processing and Processors" (U.S. Pat. No. 5,379,351). These applications and issued patents are incorporated herein by reference.

An interface between the videophone processor 200 and the telephone equipment, e.g., a POTS interface 214 or a higher-grade transmission channel (not shown), is provided using a videophone subprocessor 220 and a modem circuit 224. Unlike conventional interfaces that are arranged to act as a relay switching the telephone line either to a modem for videoconferencing or to a local telephone circuit, the videophone subprocessor and the modem circuit 224 act in parallel to process audio information and video information, respectively, without such extraneous relay-type circuitry.

The videophone subprocessor 220 can be implemented using conventional audio processing circuitry, such as a Crystal Semiconductor 4218-type codec circuit, and can be configured to interface directly and/or indirectly with user-audio tools, the direct interface being depicted by the microphone 208b, the speaker 210band/or the telephone handset 212b.

The modem circuit 224 can also be implemented using conventional circuitry, e.g., as currently used to process video data to and from hand-held cameras. In conjunction with the videophone processor 200, the modem circuit 224 is arranged and used to detect calling tones and to establish data connections with external terminals, as may be present even during ongoing telephone calls. For example, the videophone subprocessor 220 may be processing a conventional telephone-type call and a request to set up a videoconferencing call is initiated from an external terminal. The modem circuit 224 and the videophone processor 200 then detect this request and proceed by responding to the request by completing the negotiation necessary to set up the videoconferencing call. As another example application, and the videophone processor 200 may be attempting to set up a videoconferencing call and the receiving terminal is not set up with videoconferencing capabilities. The modem circuit 224 and the videophone processor 200 detect a lack of responsiveness from the receiving terminal and proceed continuing the communication as an audio-only telephone call and, optionally, by reporting the status to the initiating user, e.g., a display 206.

The parallel processing of the audio and video signal components terminates in one direction by summing the respective outputs of the subprocessor 220 and of the modem 224 at summer circuit 222. The summer circuit 222, which can be implemented using conventional analog summing circuitry such as operational amplifiers, generates a summed-signal output for a telephone interface, such as the depicted POTS interface 214, and for a separator circuit 228.

The separator circuit 228 is configured to provide respective audio and video feedback signals to the videophone subprocessor 220 and the modem 224. The feedback signals are used by the videophone subprocessor 220 and the modem 224 for conventional feedback cancellation for signals directed to the communication channel. For a particular application, this can include gain adjustment via factory-set or processor selectable programmable resistors. The feedback signals are also used as parallel processed video and audio signals as received over the communication channel in combined form. Thus, the separator 228 permits the videophone subprocessor 220 and the modem 224 to monitor the respective audio and video information separately. The summer 222 and the separator 228 of FIG. 2 may be implemented using conventional digital signal processing circuitry and, alternatively, using more discrete circuitry such as the example signal separator circuit illustrated in FIG. 3.

Figure 3:
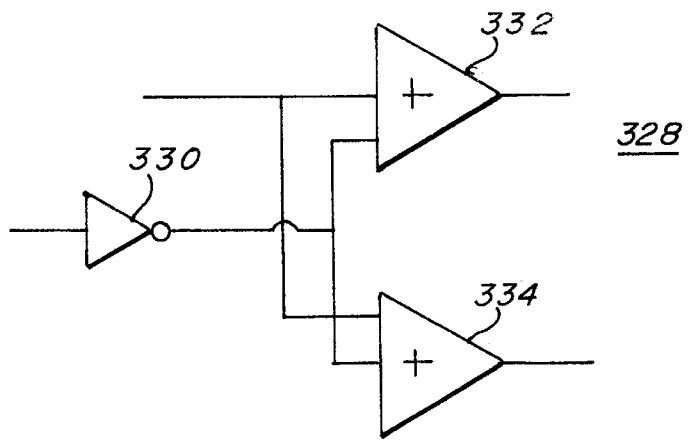
FIG. 3 is a diagram of an example signal separator circuit, according to another aspect of the present invention.

The example signal separator circuit illustrated in FIG. 3, depicted as 328, includes an analog inverter 330 and a pair of analog summer circuits 332 and 334. The summer circuits 332 and 334 can be constructed in a manner similar to the summer circuit 222 of FIG. 2. The analog inverter 330 receives the signal output of the summer circuit 222, shifts the phase of this signal by 180 degrees, and provides a phase-shifted signal to an input of each of the summer circuits 332 and 334. The remaining input of each of the summer circuits 332 and 334 receives the output of the telephone interface, depicted as 214 of FIG. 2. These signals are then used by the parallel processing circuits as previously described for signal cancellation.

The various embodiments described above are provided by way of illustration only and should not be construed to limit the invention. Those skilled in the art will readily recognize various modifications and changes that may be made to the present invention without strictly following the example embodiments and applications illustrated and described herein, and without departing from the true spirit and scope of the present invention, which is set forth in the following claims.

What is claimed is:

1. A videophone for use as part of a communication system for transceiving video and another type of information over a communication channel, comprising:

a signal processing circuit configured and arranged to process video and another type of information, respectively, in parallel data paths and to operate in a non-video mode in response to another communicatively-coupled terminal sending information representing that the other terminal is not operable as a compatible videophone, and to operate in a video mode in response to another terminal sending information representing that the other terminal is operable as a compatible videophone; and a two-way converter circuit coupled between the signal processing circuit and the communication channel and configured to transceive the video arid the other type of information as processed in the parallel data paths with the signal processing circuit, to transceive the video and the other type of information with the communication channel, and to cancel a signal transmitted to the communication channel from a signal received from the communication channel using a feedback path emanating from the two-way converter circuit.

2. A videophone, according to claim 1, wherein the other type of information includes at least one of: an audio component and a data component.

3. A videophone, according to claim 1, wherein the two-way converter circuit includes digital signal processor programmed to sum and separate the video and other type of information.

4. A videophone, according to claim 1, wherein the two-way converter circuit includes an audio subprocessor programmed to transceive audio information with a speaker and a microphone.

5. A videophone, according to claim 1, wherein the two-way converter circuit includes an audio subprocessor programmed to transceive audio information and not video information.

6. A videophone, according to claim 1, wherein the two-way converter circuit includes a modem arranged to transceive video information.

7. A videophone, according to claim 1, wherein the signal processing circuit includes an audio subprocessor programmed to transceive audio information and not video information, and a modem arranged to transceive video information and not audio information.

8. A videophone, according to claim 7, wherein the signal processing circuit further includes a programmed processor constructed and arranged to process video information and interface the video information with a camera.

9. A videophone, according to claim 1, wherein the non-video mode is an audio mode, and wherein the videophone communicates in the audio mode while the video mode is disabled.

10. A method for using a videophone to transceive video and another type of information over a communication channel, the method comprising:

providing a signal processor circuit and a set of parallel data paths for carrying video and another type of information, respectively, separately;

in response to another communicatively-coupled terminal sending information representing that the other terminal is not operable as a compatible videophone, ignoring data that would otherwise be present as video in the set of parallel data paths and processing only the other type of information;

in response to another terminal sending information representing that the other terminal is operable as a compatible videophone, using the signal processor circuit to process both the video and the other type of information in a videophone call;

coupling the set of parallel data paths with the communication channel; and cancelling a signal transmitted to the communication channel from a signal received from the communication channel using a feedback path emanating from the two-way converter circuit.

11. A method, according to claim 10, further comprising the step of providing a summer to sum the information carried by the set of paths and a separator separating the information from the communication channel into separate information channels.

12. A method, according to claim 11, wherein the set of parallel data paths includes a first set of send channels and a second set of receive channels coupled to the separator.

13. A method, according to claim 10, wherein the set of parallel data paths includes a first set of send channels and a second set of receive channels.

14. A videophone for use as part of a communication system for transceiving video and another type of information over a communication channel, comprising:

processing means for processing video and another type of information, respectively, in parallel data paths and to operate in a non-video mode in response to another communicatively-coupled terminal sending information representing that the other terminal is not operable as a compatible videophone, and to operate in a video mode in response to another terminal sending information representing that the other terminal is operable as a compatible videophone;

means coupled between the processing means and the communication channel and for transceiving the video and the other type of information as processed in the parallel data paths with the processing means, for transceiving the video and the other type of information with the communication channel, and for canceling a signal transmitted to the communication channel from a signal received from the communication channel using a feedback path emanating from the means coupled between the processing means and the communication channel.

15. A videophone, according to claim 14, wherein the non-video mode is an audio mode, and wherein the videophone communicates in the audio mode while the video mode is disabled.

16. A system for videophone communication in which video and another type of information are sent over a communication channel, comprising:

a videophone arrangement having a signal processing circuit, and a two-way converter circuit;

the signal processing circuit configured and arranged to process video and another type of information, respectively, in parallel data paths and to operate in a non-video mode in response to another communicatively-coupled terminal sending information representing that the other terminal is not operable as a compatible videophone, and to operate in a video mode in response to another terminal sending information representing that the other terminal is operable as a compatible videophone;

the two-way converter circuit coupled between the signal processing circuit and the communication channel and configured to transceive the video and the other type of information as processed in the parallel data paths with the signal processing circuit, to transceive the video and the other type of information with the communication channel, and to cancel a signal transmitted to the communication channel from a signal received from the communication channel using a feedback path emanating from the means coupled between the processing means and the communication channel; and another communications terminal constructed and coupled for transceiving over the communication channel.

17. A system, according to claim 16, wherein the other communications terminal includes the other communicatively-coupled terminal sending information representing that the other terminal is not operable as a compatible videophone .

18. A system, according to claim 16, wherein the other communications terminal includes the other communicatively-coupled terminal sending information representing that the other terminal is operable as a compatible videophone.

\* \* \* \* \*